US011460350B2

(12) United States Patent
Greenfield et al.

(10) Patent No.: US 11,460,350 B2
(45) Date of Patent: Oct. 4, 2022

(54) BATHYTHERMOGRAPH BUOY AND ASSOCIATED METHOD OF OPERATION

(71) Applicant: THE BOEING COMPANY, Chicago, IL (US)

(72) Inventors: Michael Jeffrey Greenfield, Huntington Beach, CA (US); Randall L. Mosten, Huntington Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 260 days.

(21) Appl. No.: 16/567,829

(22) Filed: Sep. 11, 2019

(65) Prior Publication Data

US 2021/0072094 A1  Mar. 11, 2021

(51) Int. Cl.
| | |
|---|---|
| *G01K 1/14* | (2021.01) |
| *B63B 22/00* | (2006.01) |
| *G01K 1/02* | (2021.01) |
| *B63B 22/06* | (2006.01) |
| *G01K 1/26* | (2006.01) |

(52) U.S. Cl.
CPC ............ *G01K 1/146* (2013.01); *B63B 22/003* (2013.01); *B63B 22/06* (2013.01); *G01K 1/026* (2013.01); *G01K 1/26* (2013.01); *G01K 2213/00* (2013.01)

(58) Field of Classification Search
CPC .......... G01K 1/146; G01K 1/026; G01K 1/26; G01K 2213/00; B63B 22/003; B63B 22/06

See application file for complete search history.

(56) References Cited

U.S. PATENT DOCUMENTS

| | | | | |
|---|---|---|---|---|
| 3,511,092 A | * | 5/1970 | Saunders | G01K 1/146 340/850 |
| 3,520,188 A | * | 7/1970 | Bixby | G01K 1/022 73/170.34 |
| 3,605,492 A | * | 9/1971 | Stohrer et al. | G01K 1/146 73/170.34 |
| 3,628,205 A | * | 12/1971 | Starkey | B63B 22/003 367/4 |

(Continued)

OTHER PUBLICATIONS

"AN/SSQ-36B SonoBuoy", *Sonobuoy Tech Systems*, 2 pgs.
"AN/SSQ-536G Bathythermal Buoy", *Ultra Electronics Maritime Systems Inc.*, 2 pgs., (2014).

*Primary Examiner* — Lisa M Caputo
*Assistant Examiner* — Philip L Cotey
(74) *Attorney, Agent, or Firm* — Alston & Bird LLP (57) ABSTRACT

A bathythermograph buoy and an associated method of operation are provided to measure temperature and/or optionally other parameter(s) within an ocean or another body of water. A bathythermograph buoy includes a housing and one or more sensors carried by the housing and configured to repeatedly measure one or more respective parameters as the bathythermograph buoy descends. The bathythermograph buoy of one example also includes a memory carried by the housing and configured to store representations of the one or more respective parameters measured by the one or more sensors. The bathythermograph buoy further includes a buoyancy modification device configured to increase buoyancy of the bathythermograph buoy to permit the bathythermograph buoy to ascend.

20 Claims, 4 Drawing Sheets

(56) References Cited

U.S. PATENT DOCUMENTS

| | | | | |
|---|---|---|---|---|
| 3,800,346 A * | 4/1974 | White | ............ | B63B 22/14 |
| | | | | 374/208 |
| 4,493,664 A * | 1/1985 | Dale | ............ | B63B 22/003 |
| | | | | 367/4 |
| 5,191,790 A * | 3/1993 | Layport | ............ | G01K 13/00 |
| | | | | 73/170.33 |
| 7,013,827 B2 * | 3/2006 | Harland-White | ...... | B63G 8/001 |
| | | | | 114/321 |
| 8,205,570 B1 * | 6/2012 | Tureaud | ............ | B63G 8/14 |
| | | | | 114/330 |
| 9,381,987 B1 * | 7/2016 | Dufour | ............ | B63G 8/001 |
| 9,563,203 B2 * | 2/2017 | Davoodi | ............ | B63G 8/001 |
| 9,718,523 B2 * | 8/2017 | Tan | ............ | B63G 8/001 |
| 9,809,281 B2 * | 11/2017 | Welch | ............ | B63B 22/22 |
| 10,067,507 B2 * | 9/2018 | Davoodi | ............ | B63B 22/22 |
| 10,322,782 B1 * | 6/2019 | Brown | ............ | B63G 8/20 |
| 10,464,645 B2 * | 11/2019 | Jamieson | ............ | B63G 8/001 |
| 2003/0204779 A1 * | 10/2003 | Belenger | ............ | G06F 11/3696 |
| | | | | 714/E11.219 |
| 2010/0034054 A1 * | 2/2010 | Wayland | ............ | G01S 7/539 |
| | | | | 367/87 |
| 2011/0055746 A1 * | 3/2011 | Mantovani | ............ | B63C 11/26 |
| | | | | 715/848 |
| 2011/0259096 A1 * | 10/2011 | Earle | ............ | G01W 1/08 |
| | | | | 73/170.16 |
| 2012/0289103 A1 * | 11/2012 | Hudson | ............ | F42B 19/06 |
| | | | | 290/1 R |
| 2013/0239870 A1 * | 9/2013 | Hudson | ............ | B63G 8/001 |
| | | | | 114/333 |
| 2015/0120045 A1 * | 4/2015 | Tan | ............ | B63G 8/001 |
| | | | | 700/250 |
| 2016/0340001 A1 * | 11/2016 | Welch | ............ | B63B 22/22 |
| 2018/0170486 A1 * | 6/2018 | Sinclair | ............ | A01K 63/00 |
| 2018/0186438 A1 * | 7/2018 | Jamieson | ............ | B63G 8/22 |
| 2019/0016419 A1 * | 1/2019 | Sheldon-Coulson | ............ | |
| | | | | F03B 13/183 |
| 2019/0250672 A1 * | 8/2019 | Bhattacharyya | ...... | G06F 1/1656 |

* cited by examiner

BATHYTHERMOGRAPH BUOY AND ASSOCIATED METHOD OF OPERATION

TECHNOLOGICAL FIELD

An example of the present disclosure relates generally to a bathythermograph buoy and associated method of operation and, more particularly, to a bathythermograph buoy that measures temperature and/or other parameter(s) within an ocean or another body of water and that wirelessly reports information regarding the temperature and/or other parameter(s).

BACKGROUND

It is instructive to know the temperature of a body of water at different depths within the body of water for a variety of different purposes. For example, the temperature within a body of water impacts the speed of sound transmitted through the body of water. As such, measurement of the temperature of the body of water at different depths permits the speed of sound to be more accurately estimated at different depths and, as a result, permits ray trace and propagation models to produce more accurate results regarding the source of sound within the body of water. Additionally, measurement of the temperature of the body of water at different depths may be instructive for environmental monitoring or other applications.

Bathythermograph buoys, also known as bathythermograph sonobuoys, have been developed to measure water temperatures up to a predefined depth, such as 1000, 2000 or 2625 feet. One type of bathythermograph buoy includes an upper unit that remains at the surface of a body of water and a lower unit that descends into the body of water following deployment. For example, the bathythermograph buoy may be launched, such as being dropped from an aircraft or deployed from a surface vessel, with the lower unit then descending into the body of water while the upper unit remains floating upon the surface of the body of water. The upper and lower units of this type of bathythermograph buoy are connected by a cable. As the lower unit descends, the cable is spooled out until the cable reaches its maximum length, such as 2625 feet, at which point the lower unit can descend no further while remaining connected to the upper unit.

The lower unit of this bathythermograph buoy includes a temperature sensor for measuring the temperature of the body of water at different depths. The cable connecting the upper and lower units serves as a wireline link such that temperature readings captured by the temperature sensor of the lower unit may be transmitted from the lower unit to the upper unit via the cable. The upper unit may, in turn, transmit information regarding the temperature readings captured by the lower unit, such as to a receiver onboard an aircraft or surface vessel, such as the aircraft or surface vessel that launched the bathythermograph buoy.

As an example of the transmission of information regarding temperature readings, a sonobuoy that conforms to a designation such as AN/SSQ-36B bathythermograph sonobuoy linearly maps the temperature readings across a range of 28° F. to 95° F. to a tone frequency, which is transmitted by a transmitter carried by the upper unit. For example, the tone frequency f may be related to the temperature reading T as $f=800+20T$ with the tone frequency f being in Hertz (Hz) and the temperature T being in degrees Fahrenheit. With respect to the AN/SSQ-36B bathythermograph sonobuoy, the depth associated with the temperature readings is calculated as a linear function of time with an assumed descent rate, such as an assumed descent rate of five feet per second. In this regard, the temperature sensor of the lower unit may be configured to capture temperature readings at a predefined rate, such as one temperature reading every one second. As such, the initial temperature reading may be determined to be at the surface of the body of water with each subsequent temperature reading being five feet deeper than the preceding temperature reading (as a result of an assumed descent rate of five feet per second). Based upon the temperature of the body of water as measured at different depths by the bathythermograph sonobuoy, the speed of sound at different depths within the body of water may be estimated so as to permit, for example, ray trace and propagation models to more accurately estimate the location of the source of the sound.

While the connection of the upper and lower units by a cable permits the temperature reading to be transmitted from the lower unit to the upper unit via the wireline connection, the cable limits the depth to which the bathythermograph buoy can obtain temperature readings. While depths of 2625 feet may be sufficient for some applications, it may be desirable in other applications to measure the temperature within a body of water at deeper depths than those allowed by bathythermograph buoys having upper and lower units connected by a cable. Further, the connection of the upper and lower units by a cable may cause the bathythermograph buoy to have a larger volume than is desired in at least some instances as the bathythermograph buoy must include a housing sufficient in size to store the length of cable that will be unspooled as the lower unit descends through the body of water.

Moreover, the estimation of the depth based upon a predefined rate of descent, such as five feet per second, is typically based upon an estimate of the unspooling rate of the cable. However, the use of a predefined descent rate ignores mass changes associated with the lower unit as the cable unspools and, as a result, may not accurately reflect the depth at which a temperature reading is obtained, particularly once a significant length of the cable has been unspooled. Further, the estimation of depth based upon a predefined descent rate may ignore other effects that may lead to depth estimation errors, such as kiting and/or canting of the bathythermograph buoy. Such effects may lead to depth estimation errors on the order of 10% to 20% in some instances. A depth estimation error may, in turn, disadvantageously result in determinations that are premised upon the depth, such as the speed of sound at different depths, being correspondingly inaccurate.

BRIEF SUMMARY

A bathythermograph buoy and an associated method of operation are provided to measure temperature and/or optionally other parameter(s), such as pressure, within an ocean or another body of water. In an example, the bathythermograph buoy is configured to ascend after having measured one or more parameters, such as temperature, during its descent through the body of water and to then transmit representations of the one or more parameters that have been measured following its ascent. Thus, the depth to which the bathythermograph buoy descends and measures one or more parameters is not limited by a cable such that the one or more parameters, such as temperature, may be measured at deeper depths. By no longer relying upon a cable for communication, the bathythermograph buoy may be more compact as the housing of the bathythermograph buoy need not store the cable spool. Further, by no longer being tethered by a cable, the rate of descent of the bathythermograph buoy may be more consistent and, as a result, the resulting temperature profile with depth may be more accurate by avoiding changes that may otherwise occur in the rate of descent as the cable unspools and the mass that is descending is correspondingly reduced.

In an example of the present disclosure, a bathythermograph buoy is provided that includes a housing and one or more sensors carried by the housing and configured to repeatedly measure one or more respective parameters as the bathythermograph buoy descends. The bathythermograph buoy also includes a memory carried by the housing and configured to store representations of the one or more respective parameters measured by the one or more sensors. The bathythermograph buoy further includes a buoyancy modification device configured to increase buoyancy of the bathythermograph buoy to permit the bathythermograph buoy to ascend.

The bathythermograph buoy of an example also includes a transmitter configured to transmit at least some of the representations of the one or more respective parameters measured by the one or more sensors and stored by the memory. The bathythermograph buoy of this example may further include a surface flotation device configured to be or remain inflated during operation of the transmitter. The bathythermograph buoy may also include a receiver configured to receive instructions regarding at least some of the operations of the bathythermograph buoy.

The housing of an example includes first and second portions. In this example, the first portion may include ballast and the second portion may carry the memory, and the buoyancy modification device may be configured to release the first portion of the housing to permit the second portion of the housing to ascend without the first portion of the housing. In this example, the one or more sensors may be carried by the first portion of the housing. Alternatively, the one or more sensors may be carried by the second portion of the housing and may also be configured to measure one or more respective parameters as the bathythermograph buoy ascends. The buoyancy modification device of another example includes a flotation device configured to be inflated following descent to at least a predefined depth.

In another example of the present disclosure, a bathythermograph buoy is provided that includes a receiver configured to receive instructions regarding at least some of operations of the bathythermograph buoy. The bathythermograph buoy also includes a housing and one or more sensors carried by the housing and configured to repeatedly measure one or more respective parameters as the bathythermograph buoy descends. The bathythermograph buoy also includes a buoyancy modification device configured to increase buoyancy of the bathythermograph buoy to permit the bathythermograph buoy to ascend. The bathythermograph buoy further includes a transmitter configured to transmit representations of at least some of the one or more respective parameters measured by the one or more sensors following the increase in buoyancy provided by the buoyancy modification device.

The transmitter of an example is configured to transmit representations of at least some of the one or more respective parameters measured by the one or more sensors once the bathythermograph buoy reaches a surface. In an example, the bathythermograph buoy also includes a surface flotation device configured to be or remain inflated during operation of the transmitter.

The housing of an example includes first and second portions. In one example, the first portion includes ballast and the second portion carries the memory. In this example, the buoyancy modification device is configured to release the first portion of the housing to permit the second portion of the housing to ascend without the first portion of the housing. In one example, the one or more sensors are carried by the first portion of the housing, while in another example, the one or more sensors are carried by the second portion of the housing and are also configured to measure one or more respective parameters as the bathythermograph buoy ascends. In an example, the buoyancy modification device includes a flotation device configured to be inflated following descent to at least a predefined depth.

In a further example of the present disclosure, a method is provided for operating a bathythermograph buoy. The method includes launching the bathythermograph buoy such that the bathythermograph buoy descends through a body of water and then measuring one or more parameters with one or more sensors of the bathythermograph buoy as the bathythermograph buoy descends. The method also includes increasing the buoyancy of the bathythermograph buoy following descent of the bathythermograph buoy to at least a predefined depth. Following the increase in the buoyancy of the bathythermograph buoy, the method further includes transmitting representations of the one or more parameters measured by the one or more sensors.

The method of an example also includes storing representations of the one or more parameters measured by the one or more sensors prior to ascent of the bathythermograph buoy and transmission of the representations of the one or more parameters. In an example, the method also includes inflating a surface flotation device or causing the surface flotation device to remain inflated while transmitting the representations of the one or more respective parameters measured by the one or more sensors. In an example in which the bathythermograph buoy includes a housing comprising first and second portions and the first portion comprises ballast, the method increases the buoyancy of the bathythermograph buoy by releasing the first portion of the housing to permit the second portion of the housing to ascend without the first portion of the housing. In an example in which the one or more sensors are carried by the second portion of the housing, the method further includes measuring one or more parameters with the one or more sensors as the second portion of the housing of the bathythermograph buoy ascends.

BRIEF DESCRIPTION OF THE DRAWINGS

Having described certain examples of the present disclosure in general terms above, reference will now be made to the accompanying drawings, which are not necessarily drawn to scale and wherein.

DETAILED DESCRIPTION

Some examples of the present disclosure will now be described more fully hereinafter with reference to the accompanying drawings, in which some, but not all examples of the present disclosure are shown. Indeed, these examples may be embodied in many different forms and should not be construed as limited to the examples set forth herein; rather, these examples are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with examples of the present disclosure. Thus, use of any such terms should not be taken to limit the spirit and scope of examples of the present disclosure.

A bathythermograph buoy is provided along with an associated method of operation. The bathythermograph buoy is configured to be launched into a body of water and to descend within the body of water while measuring one or more parameters, such as the temperature of the body of water at different depths. After having descended into the body of water, the bathythermograph buoy is configured to change its buoyancy and to ascend through the body of water prior to transmitting the parameters that have been measured, such as to a receiver onboard an aircraft, a vessel or the like. Based upon the measured parameters, such as the temperature of the body of water at different depths, the speed of sound within the body of water may be estimated.

Figure 1:
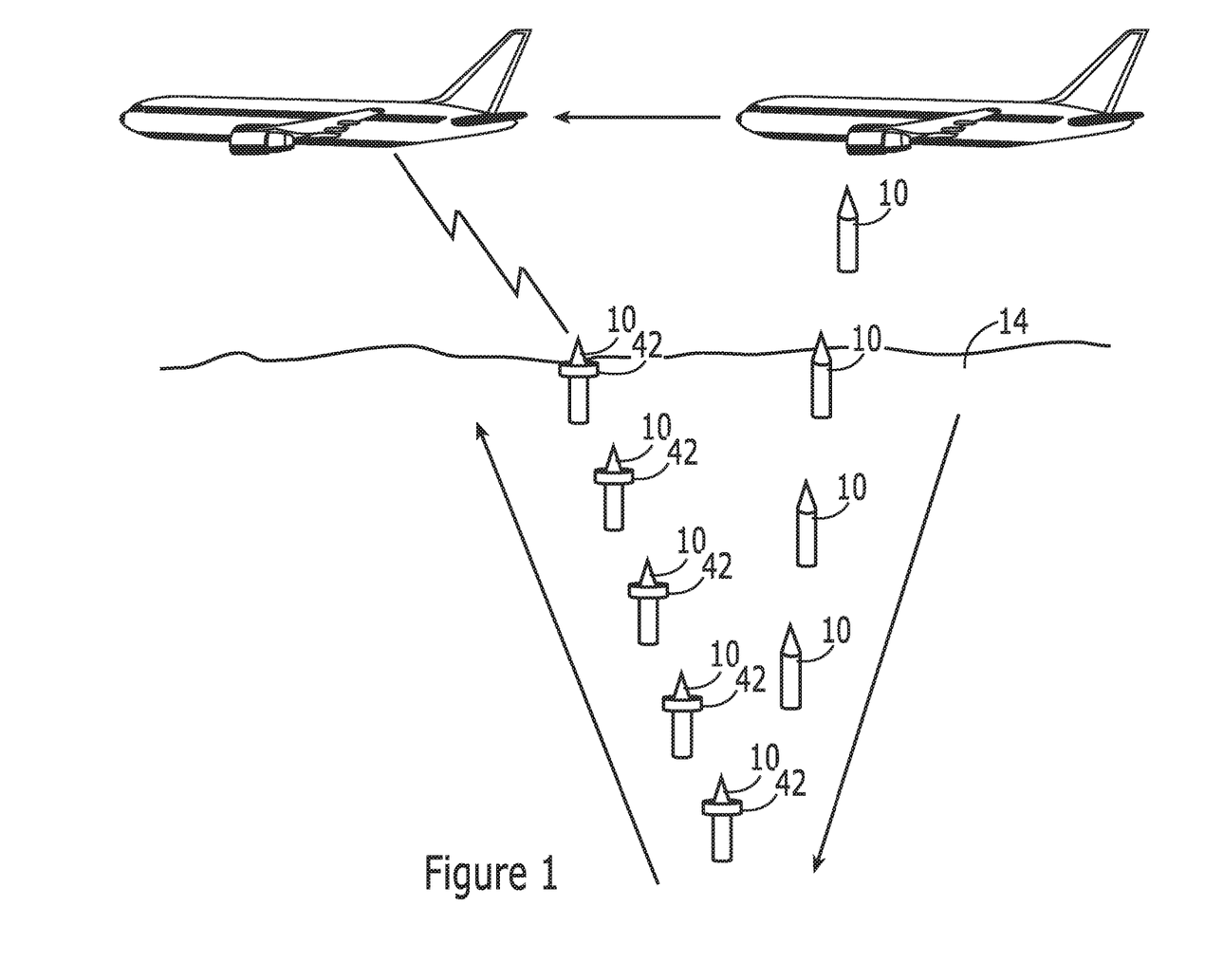
FIG. 1 is a schematic representation depicting launch, descent and ascent of a bathythermograph buoy in accordance with an example of the present disclosure.

By way of example, FIG. 1 depicts a bathythermograph buoy 10 being launched from an aircraft 12 flying over a body of water 14, such as an ocean. As shown, the bathythermograph buoy 10 is launched by being dropped from the aircraft 12 into the body of water 14. Although FIG. 1 depicts the bathythermograph buoy 10 being launched from a fixed wing aircraft, the bathythermograph buoy may be launched in any of a wide variety of other manners, such as from other types of air vehicles including, for example, rotary wing aircraft, a drone or the like. Alternatively, the bathythermograph buoy 10 may be launched from a ship, a boat, or other marine vehicle or may otherwise placed into the body of water 14, such as from any of a variety of different platforms. The bathythermograph buoy 10 has a density, at least initially, that is greater than the density of the water such that the bathythermograph buoy descends through the body of water 14. Following its launch and entry into the body of water 14, the bathythermograph buoy 10 is configured to repeatedly measure one or more parameters. For example, the bathythermograph buoy 10 of one example is configured to initially measure the one or more parameters upon contact with the body of water 14 such that the initial measurement of the one or more parameters is representative of the parameters at the surface of the body of water. Thereafter, the bathythermograph buoy 10 of this example is configured to measure the one or more parameters in accordance with a predefined schedule, such as in a periodic manner, as the bathythermograph buoy descends through the body of water 14. The bathythermograph buoy 10 may be configured to measure various parameters including, for example, the temperature of the water. In addition to or instead of the temperature of the water, the bathythermograph buoy 10 of an example may measure the salinity of the water and/or the pressure exerted upon the bathythermograph buoy by the body of water 14 at different depths.

As shown in FIG. 1, following the descent of the bathythermograph buoy 10 into the body of water 14, such as following the descent to at least a predefined depth, the density of the bathythermograph buoy is configured to be changed such that the density of the bathythermograph buoy becomes less than that of the water. The bathythermograph buoy 10 then begins to ascend through the body of water 14 to the surface. During the ascent, the bathythermograph buoy 10 is optionally configured to measure one or more parameters, such as the same one or more parameters measured by the bathythermograph buoy during its descent through the body of water 14, such as by measuring the temperature of the body of water and optionally the salinity and/or the pressure exerted by the water. During or following the ascent, the bathythermograph buoy 10 of an example is configured to transmit the information regarding the parameters that have been measured. As shown, the bathythermograph buoy 10 of an example is configured to transmit the information regarding the parameters that have been measured, such as to the aircraft 12 or alternatively the ship, boat or other marine vessel or other platform or vessel from which the bathythermograph buoy was launched. Based upon the information regarding the parameters measured by the bathythermograph buoy 10, the speed of sound within the body of water 14, such as the speed of sound at different depths within the body of water, may be estimated, such as based upon the temperature of the body of water at different depths and/or based on upon the salinity and/or pressure exerted by the body of water at different depths.

Figure 2:
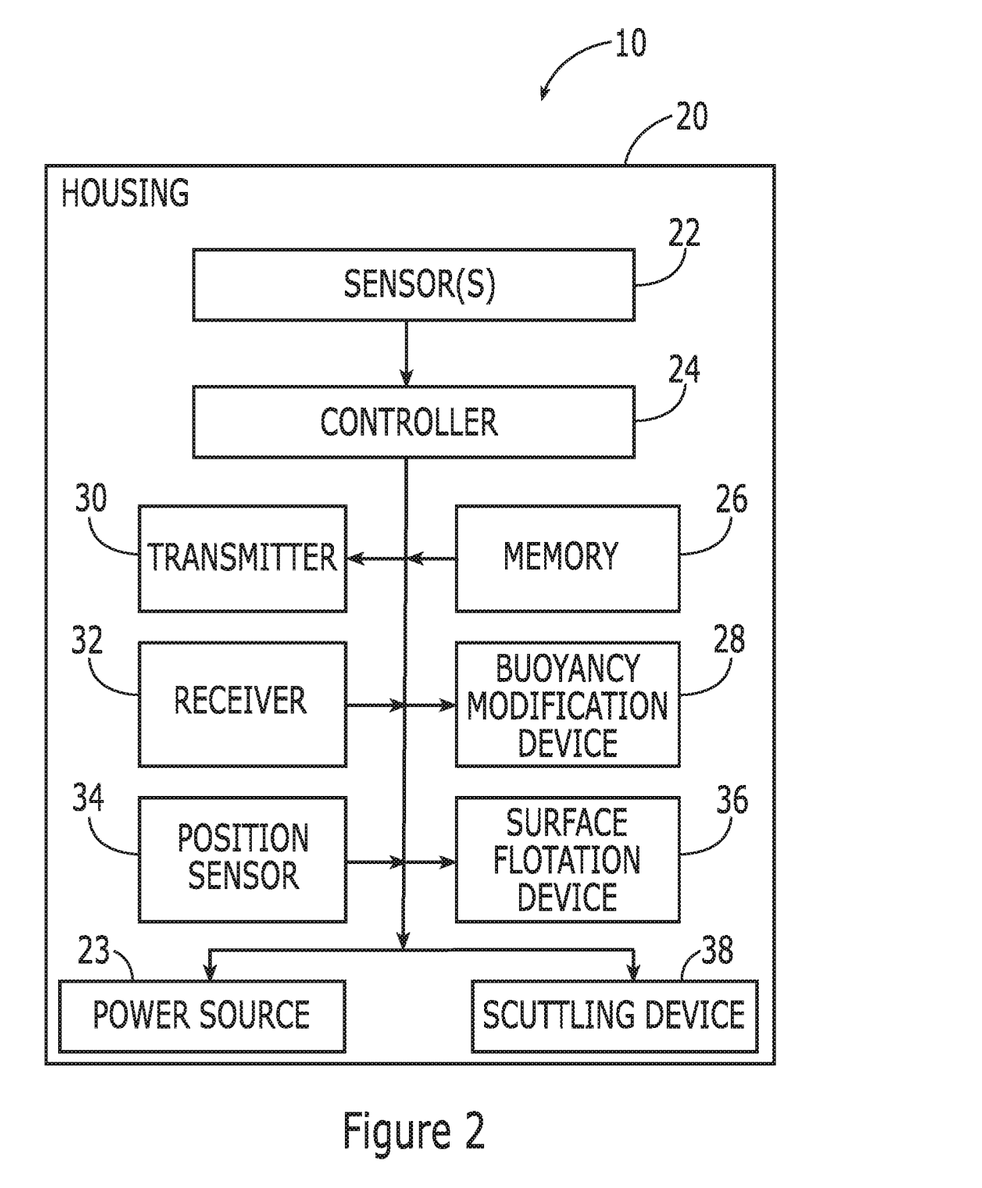
FIG. 2 is a block diagram of a bathythermograph buoy in accordance with an example of the present disclosure.

Referring now to FIG. 2, a block diagram of a bathythermograph buoy 10 in accordance with an example is depicted. As shown, the bathythermograph buoy 10 includes a housing 20, one of more sensors 22 and a power source 23 disposed within the housing. In this regard, the housing 20, or at least the portion of the housing in which the sensors 22 are disposed, is configured to be waterproof. The one or more sensors 22 may be configured to measure a variety of different parameters. In an example, the bathythermograph buoy 10 includes a temperature sensor configured to measure the temperature of the water within which the bathythermograph buoy is disposed. Additionally or alternatively, the bathythermograph buoy 10 may include a sensor 22 configured to measure the pressure of the water in which the bathythermograph buoy is disposed, such as a pressure transducer, and/or a sensor to measure the salinity of the water within which the bathythermograph buoy is disposed. The power source 23 may be embodied in a number of different ways and may include, for example, a battery, such as a battery made of individual lithium cells.

The sensors 22 may be configured to be activated, such as upon deployment or launch of the bathythermograph buoy 10 or upon contact of the bathythermograph buoy with a body of water 14 in order to begin measurements of the respective parameter and to repeatedly make such measurements, such as on a periodic basis. In the illustrated example, the bathythermograph buoy 10 includes a controller 24 configured to control operation of the one or more sensors 22. In this regard, the controller that embodies the controller 24 may be configured in various manners including, for example, by processing circuitry. The processing circuitry may, in turn, be embodied in a number of different ways and may, for example, include one or more processing devices configured to perform independently. Additionally or alternatively, the processing circuitry may include one or more processors configured in tandem via a bus to enable independent execution of software instructions, pipelining, and/or multithreading. The use of the terms "processor" or "processing circuitry" may be understood to include a single core processor, a multi-core processor, multiple processors, remote or "cloud" processors, or any combination thereof.

In an example, the processing circuitry that embodies the controller 24 may include one or more dedicated processor, specially configured field programmable gate array (FPGA), or application specific interface circuit (ASIC) to perform its corresponding functions. The processing circuitry may additionally or alternatively be implemented using a processor executing software stored in a memory (e.g., memory 26). In this fashion, the processing circuitry may therefore be implemented using special-purpose components implemented purely via hardware design or may utilize hardware components of the controller 24 that execute computer software designed to facilitate performance of the functions of the processing circuitry.

The controller 24 of the illustrated example may also include or be associated with memory 26 and the processing circuitry of this example may be configured to execute software instructions stored in the memory or otherwise accessible to the processing circuitry. In this example, the memory 26 is non-transitory and may include, for example, one or more volatile and/or non-volatile memories. In other words, for example, the memory 26 may be an electronic storage device (e.g., a computer readable storage medium). The memory 26 may be configured to store information, data, content, applications, software instructions, or the like, for enabling the controller 24 to carry out various functions in accordance with examples contemplated herein. Alternatively or additionally, the processing circuitry may be configured to execute hard-coded functionality. As such, whether configured by hardware or software methods, or by a combination of hardware with software, the processing circuitry may represent an entity (e.g., physically embodied in circuitry) capable of performing operations according to an example of the present disclosure while configured accordingly. Alternatively, as another example, when the processing circuitry is embodied as an executor of software instructions, the software instructions may specifically configure the circuitry to perform the algorithms and/or operations described herein when the software instructions are executed.

Regardless of the manner in which the controller 24 is embodied, the controller of an example is configured to direct the one or more sensors 22 to measure one or more parameters upon contact of the bathythermograph buoy 10 with the body of water 14 and to thereafter capture measurements of the one or more parameters on a repeated basis, such as a periodic basis. In an example, the memory 26 of the bathythermograph buoy 10 is configured to store information regarding the measurements captured by the at least one sensor 22, such as by storing the values measured by the at least one sensor along with information regarding the time and/or depth at which the measurement was captured. For example, information regarding the time at which a measurement is captured may be provided by the controller 24 or a timer carried by the bathythermograph buoy 10. Alternatively, the information regarding the depth at which the measurement was captured may be provided in various manners. In an example in which the measurements are captured on a periodic basis, the information regarding the depth at which a measurement was captured may include an indication of the order in which the plurality of measurements were obtained, such that the measurements may be designated as the first measurement, the second measurement, the third measurement and so on. The indication of the order in which the plurality of measurements were obtained may be provided in various manners, such as in terms of a numerical indication associated with the information regarding the measurements or based upon the order in which the information regarding the measurements is stored by the memory 26. As the bathythermograph buoy 10 is configured to descend through the body of water at a predetermined rate, the capture of the first measurement at the surface of the body of water 14 and the subsequent periodic capture of additional measurements coupled with an indication as to the order in which the plurality of measurements are captured permits the depth at which each measurement was captured to be estimated.

Although the depth to which a bathythermograph buoy 10 descends may be estimated based upon the descent time and a predefined rate of descent, the depth to which the bathythermograph buoy descends may be determined in other manners. For example, sensors 22 may include a pressure sensor, e.g., a pressure transducer, which measure the pressure of the water at the current location of the bathythermograph buoy 10. As the pressure of the water is dependent upon the depth, the depth to which the bathythermograph buoy 10 has descended may alternatively be estimated based upon the pressure of the water, as measured by a pressure sensor.

As schematically represented in FIG. 2, the bathythermograph buoy 10 of an example also includes a buoyancy modification device 28. The buoyancy modification device 28 is configured to increase the buoyancy of the bathythermograph buoy 10 to permit the bathythermograph buoy to ascend. In this regard, the buoyancy modification device 28 of an example is configured to increase the buoyancy of the bathythermograph buoy 10 from a density that is greater than the density of the water through with which the bathythermograph buoy is descending to a density that is less than that of the water such that the bathythermograph buoy no longer descends and, instead, begins to ascend through body of water 14 as a result of the lower density. As described below, the buoyancy modification device 28 may be configured in various manners. During the ascent of the bathythermograph buoy 10, the one or more sensors 22 may also optionally be configured to capture measurements of one or more parameters, such as the same one or more parameters measured during the descent of the bathythermograph buoy.

In an example, the buoyancy modification device 28 is configured to be triggered, such as by the controller 24, by a sensor 22, such as a pressure sensor, or otherwise, to increase the buoyancy of the bathythermograph buoy 10 at a predefined depth or at a predetermined time following the launch of the bathythermograph buoy or following initial contact of the bathythermograph buoy with the body of water 14. As the bathythermograph buoy 10 is configured to descend through the body of water 14 at a predefined rate of descent, the predetermined time following the launch of the bathythermograph buoy or the initial contact of the bathythermograph buoy with the body of water prior that elapses prior to activation of the buoyancy modification device 28 of this example embodiment permits the bathythermograph buoy to descend through the body of water to a predefined depth such that the appropriate depth of the body of water may be estimated by the parameters that have been measured by the one or more sensors 22 prior to reversing the descent and commencing the ascent of the bathythermograph buoy through the body of water.

As also shown in FIG. 2, the bathythermograph buoy 10 of an example includes a transmitter 30 configured to transmit representations of at least some of the parameters measured by the one or more sensors 22, and, in some examples, stored by the memory 26. For example, the transmitter 30 may be activated, such as by the controller 24, following the ascent of bathythermograph buoy 10 to the surface of the body of water 14, such as upon reaching the surface of the body of water. The transmitter 30 of an example is configured to wirelessly transmit the representations of the parameters measured by the one or more sensors 22, such as during the descent and, in some examples, the ascent of the bathythermograph buoy 10. The transmitter 30 of this example may be configured to wirelessly transmit the representations of the parameters measured by the one or more sensors 22 in accordance with any of a variety of different frequency bands including, for example, the very high frequency (VHF) band. The transmitter 30 of this example may be optionally configured to wirelessly transmit the temperature information encoded as a varying frequency with time. In this example, the frequency f may be related to the temperature reading T in accordance with a predefined relationship, such as f=800+20T with the tone frequency f being in Hertz (Hz) and the temperature T being in degrees Fahrenheit. The time at which the transmitter 30 transmits the signal with the frequency f may then be related to depth to permit the temperature of the water at the depth to be estimated.

Optionally, the bathythermograph buoy 10 of an example may also include a receiver 32, such as a receiver configured to receive wireless signals, such as VHF signals. The receiver 32 of this example may be configured to receive any of a variety of signals. For example, the signals may instruct the bathythermograph buoy 10 to repeat the transmission of the same representations of the parameters measured by the one or more sensors 22, such as in an instance in which the prior transmission of the representations of the parameters measured by the one or more sensors was not successfully received or otherwise was corrupted.

In an example, the bathythermograph buoy 10 may also include a position sensor 34, such as a global positioning system (GPS) sensor or another type of position sensor. The position sensor 34 may be configured, such as in response to instructions from the controller 24, to determine the location of the bathythermograph buoy 10 at the time that the bathythermograph buoy was launched, at the time that the bathythermograph buoy initially contacts the body of water 14, at the time at which the bathythermograph buoy returns to the surface of the body of water following its descent and subsequent ascent and, in some examples, at one or more instances during the descent and/or ascent of the bathythermograph buoy through the body of water, such as coincident with the measurements of the one or more parameters by the one or more sensors 22 of the bathythermograph buoy.

Based upon the location of the bathythermograph buoy 10 at the time at which the bathythermograph buoy initially makes contact with the body of water 14 and the location of the bathythermograph buoy at the time at which the bathythermograph buoy returns to the surface of the body of water following its descent and subsequent ascent, information regarding the surface currents of the body of water may be estimated including the direction of the surface current, the magnitude of the surface current or the like. In this regard, the difference between the location at which the bathythermograph buoy 10 initially makes contact with the water and at which the bathythermograph buoy returns to the surface of the body of water in relation to the difference in time at which the bathythermograph buoy initially makes contact with the surface of the body of water and subsequently returns to the surface of the body of water permits the magnitude of the surface current to be estimated. Additionally or alternatively, the sensors 22 of the bathythermograph buoy 10 may include an accelerometer to estimate the direction and magnitude of the surface currents.

The bathythermograph buoy 10 of an example may also include a surface flotation device 36 configured to be or to remain inflated during operation of the transmitter 30. For example, during the ascent of the bathythermograph buoy 10 or upon the bathythermograph buoy reaching the surface of the body of water 14 following its ascent, a surface flotation device 36, such as an inflatable bladder, may be triggered, such as by the controller 24, to inflate and to remain inflated such that the bathythermograph buoy remains floating on the surface of the body of water during operation of the transmitter 30, thereby increasing the likelihood that the signals that are transmitted will be successfully received. The surface flotation device 36 may be inflated in various manners, such as by release of compressed gas into the surface flotation device and/or in response to a chemical reaction.

Figure 3:
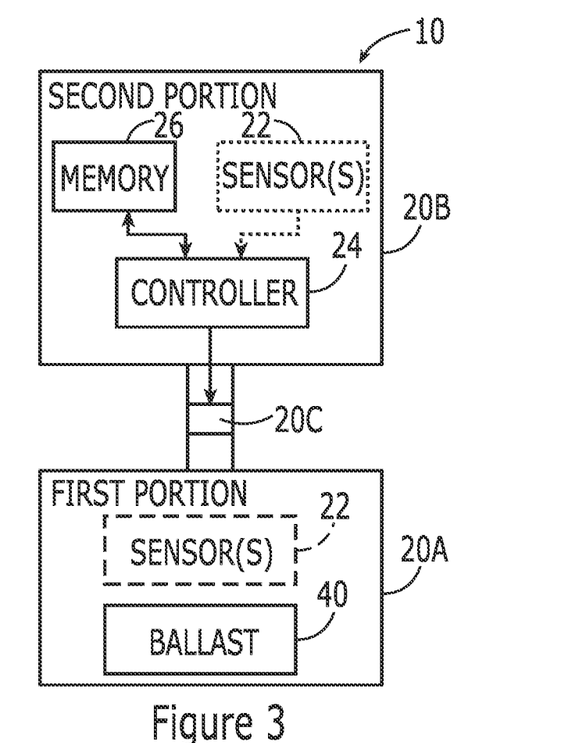
FIG. 3 illustrates a bathythermograph buoy having a housing that includes first and second portions with the first portion including ballast in accordance with an example of the present disclosure.

Referring now to FIG. 3, the bathythermograph buoy 10 of an example having a first type of buoyancy modification device 28 is depicted. In this regard, the housing 20 includes first and second portions 20A, 20B. The first portion 20A of the housing 20 of this example includes ballast 40, such as a lead weight or a weight formed of other material having a density greater than that of the water. In an example in which the bathythermograph buoy 10 includes a memory 26 for storing representations of the one or more parameters measured by the at least one sensor 22, the memory may be housed by the second portion 20B. In this example, the buoyancy modification device 28 is configured to release the first portion 20A of the housing 20, such as following descent of the bathythermograph buoy 10 to at least a predefined depth or for at least a predefined period of time which corresponds to at least the predefined depth. For example, the buoyancy modification device 28 may be triggered, such as by the controller 24, to release the first portion 20A of the housing 20. The buoyancy modification device 28 may be configured to release the first portion 20A of the housing 20 in various manners. For example, the first and second portions 20A, 20B may be mechanically coupled with the coupling being released, severed or otherwise broken in order to release the first portion of the housing, as represented by the mechanical fuse 20C (e.g., an electrically operable mechanical disconnection device) of FIG. 3 that is activated in response to a signal from the controller 24. Following the release of the first portion 20A of the housing 20, the remainder of the bathythermograph buoy 10 of this example including the second portion 20B of the housing and the components housed by the second portion of the housing has a density less than that of the water such that the remainder of the bathythermograph buoy including the second portion of the housing begins to ascend through the body of water 14.

In one example, the one or more sensors 22 are carried by the first portion 20A of the housing 20 as shown in dashed lines and, as a result, are released upon activation of the buoyancy modification device 28 and do not return to the surface of the body of water 14. In another example, however, the one or more sensors 22 are carried by the second portion 20B of the housing 20 as shown by dotted lines. In this example, the one or more sensors 22 may be configured, such as in response to instructions from the controller 24 also carried by the second portion 20B of the housing 20, to measure one or more respective parameters as the bathythermograph buoy 10 ascends through the body of water 14, such as by measuring the same one or more parameters that were measured during the prior descent of the bathythermograph buoy through the body of water. As a result of the change in density of the bathythermograph buoy 10 following the release of the first portion 20A of the housing 20, the rate at which the bathythermograph buoy ascends through the body of water 14 may be different than the rate at which the bathythermograph buoy previously descended through the body of water. As such, the relative depth within the body of water 14 at which the one or more sensors 22 measure the one or more respective parameters as the bathythermograph buoy 10 ascends may be determined differently, such as in accordance with a different rate of ascent then the rate of descent.

Figure 4:
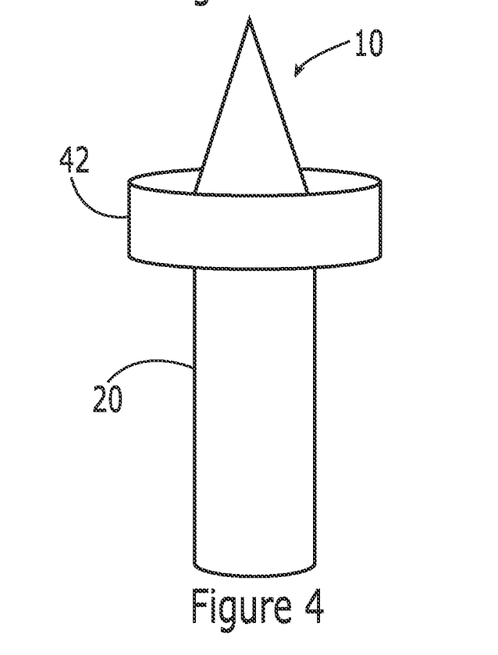
FIG. 4 illustrates a bathythermograph buoy having a buoyancy modification device that includes a flotation device in accordance with an example of the present disclosure.

In an alternative example depicted in FIG. 4, the buoyancy modification device 28 includes a flotation device 42 configured to be inflated following descent of the bathythermograph buoy 10 to at least a predefined depth. In this regard, the controller 24 may be configured to trigger the inflation of the flotation device 42 following descent of the bathythermograph buoy 10 to at least a predefined depth or following the descent of the bathythermograph buoy for at least a predetermined amount of time that corresponds to at least the predefined depth. The flotation device 42 may be inflated in various manners, such as by release of compressed gas into the flotation device and/or in response to a chemical reaction. The inflation of the flotation device 42, such as an inflatable bladder, also changes the density of the bathythermograph buoy 10 such that the density of the bathythermograph buoy changes from being denser than the water prior to inflation of the flotation device to being less dense than the water following inflation of the flotation device such that the bathythermograph buoy then begins to ascend through the body of water 14 following inflation of the flotation device. In this example, the flotation device 42 of the bathythermograph buoy may also serve as the surface flotation device 36. However, in other examples, the bathythermograph buoy 10 may include an additional or separate surface flotation device 36 that is inflated upon reaching the surface of the body of water 14, such as in response to instruction from the controller 24, in order to further stabilize the bathythermograph buoy upon the surface of the water following its ascent.

The flotation device 42 and, in an example in which the flotation device 42 also serves as the surface flotation device 36, both the flotation device 42 and the surface flotation device 36 may be configured as shown in FIG. 4. In this regard, the flotation device 42 may have an inflatable bladder having an annular section proximate one end of the housing 20 and a conical section extending from the annular section beyond the end of the housing. In an instance in which the bathythermograph buoy 10 is floating on the surface of the water, the conical section may extend upwardly away from the surface of the water. In some examples, the transmitter 30 and/or the receiver 32 may include an antenna, such as a wire, disposed with the flotation device 42 in order to facilitate the reception and/or transmission of signals.

Although the buoyancy modification device 28 may include either the release of ballast 40 or the inflation of a flotation device 42, the buoyancy modification device of an example includes both the release of ballast and the inflation of a flotation device in another example. Additionally, while two examples of a buoyancy modification device 28 are provided herein in conjunction with FIGS. 3 and 4, the buoyancy modification device 28 may be configured in other manners.

Figure 5:
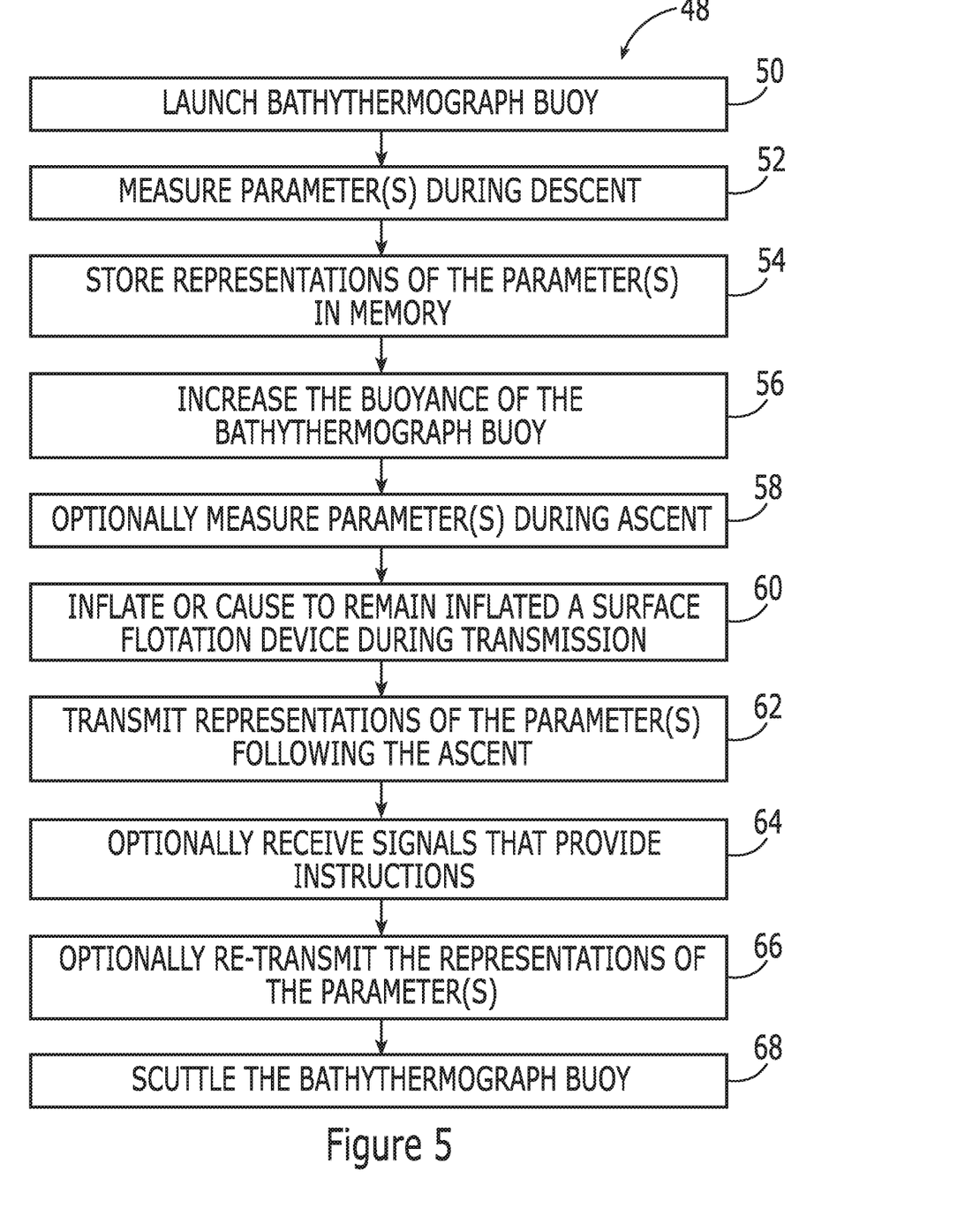
FIG. 5 is a flowchart illustrating a method for operating a bathythermograph buoy in accordance with an example of the present disclosure.

Referring now that FIG. 5, the operation of a bathythermograph buoy 10 in accordance with an example is depicted. In this example, the bathythermograph buoy 10 is initially launched so as to descend through a body of water 14. See block 50 of FIG. 5. As described above, the bathythermograph buoy 10 may be launched from an aircraft, a ship, boat or other marine vessel or from another platform. As a result of the density of the bathythermograph buoy 10 being greater than that of the water, the bathythermograph buoy then descends through the body of water 14. During the descent of the bathythermograph buoy 10, one or more sensors 22 of the bathythermograph buoy measure one or more parameters of the water, such as the temperature of the water, the salinity of the water, the pressure exerted by the body of water or the like. See block 52. For example, the one or more sensors 22 may be configured to repeatedly measure the one or more parameters, such as upon initially contacting the surface of the water and thereafter on a periodic basis. In an example, representations of the one or more parameters measured by the one or more sensors 22 may be stored by memory 26. See block 54.

Following the descent of the bathythermograph buoy 10 to at least a predefined depth or following the descent of the bathythermograph buoy for at least a predetermined amount of time that corresponds to at least the predefined depth, the buoyancy of the bathythermograph buoy is increased such that the bathythermograph buoy no longer descends through the body of water 14 but, instead, begins to ascend through the body of water. See block 56 of FIG. 5. In this regard, the buoyancy of the bathythermograph buoy 10 is increased by decreasing the density of the bathythermograph buoy from a density that is greater than that of the water during the descent of the bathythermograph buoy to a density that is less than that of the body of water 14 so as to compel the ascent of the bathythermograph buoy. As described above in conjunction with FIGS. 3 and 4, the buoyancy of the bathythermograph buoy 10 may be increased in various manners. In an example in which the housing 20 of the bathythermograph buoy 10 includes first and second portions 20A, 20B with the first portion including ballast 40, the buoyancy of the bathythermograph buoy may be increased by releasing the first portion of the housing to permit the second portion of the housing having a density less than that of the water to ascend through the body of water 14 to the surface without the first portion of the housing. Alternatively, the buoyancy of the bathythermograph buoy 10 may be increased by inflating a flotation device 42 following the descent of the bathythermograph buoy to at least a predefined depth.

As shown in block 58 of FIG. 5, one or more sensors 22 may optionally be carried by the portion of the bathythermograph buoy 10 that returns to the surface of the body of water 14 and, in this example, one or more parameters may also be measured by the one or more sensors as a bathythermograph buoy ascends. For example, the same one or more parameters may be measured during the ascent, such as the temperature, salinity and/or the pressure of the water.

In order to facilitate the transmission of the representations of the one or more parameters, a surface flotation device 36 may be inflated or caused to remain inflated, such as once the bathythermograph buoy 10 reaches the surface of the body of water 14 and while representations of the one or more parameters measured by the one or more sensors 22 are transmitted. See block 60. Following the increase in the buoyancy of bathythermograph buoy 10 and, in one example, following the ascent of the bathythermograph buoy to the surface of the body of water 14, representations of the one or more parameters measured by the one or more sensors 22 are transmitted, such as by the transmitter 30. See block 62.

Based upon the representations of one or more parameters measured by the one or more sensors 22, a computing device may be configured to estimate the speed of sound within the body of water 14 at different depths based upon, for example, the temperature of the body of water and, in some examples, also based upon the salinity and/or the pressure within the body of water at different depths.

In some example examples, the bathythermograph buoy 10, such as a receiver 32, may also be configured to receive signals, such as wireless signals that provide instructions to the bathythermograph buoy. See block 64. For example, the bathythermograph buoy 10, such as the receiver 32, may be configured to receive signals indicating that the representations of the one or more parameters measured by the one or more sensors 22 should be re-transmitted one or more times, such as in an instance in which the original transmission was corrupted or was otherwise unsuccessful. In such instances, the transmitter 30 may be configured, such as by the controller 24, to re-transmit representations of the one or more parameters measured by the one or more sensors 22. See block 66.

The bathythermograph buoy 10 of an example may also be configured to be scuttled following transmission and, in some examples, re-transmission of the representations of the one or more parameters measured by the one or more sensors 22. See block 68. Scuttling the bathythermograph buoy 10 (i.e., destroying the buoy and/or rendering the data permanently inaccessible) may be desirable to prevent recovery by an unintended party. In this regard, the bathythermograph buoy 10 may include a scuttling device 38 configured to scuttle the bathythermograph buoy following transmission of the representations of the one or more parameters measured by the one or more sensors 22 and, some examples, in response to a signal received by the receiver 32 indicating that the representations of the one or more parameters measured by the one or more sensors have been successfully received. In an example, the scuttling device 38 is an explosive device that is activated, such as by the controller 24, following transmission of the representations of the one or more parameters measured by the one or more sensors 22. The activation of the explosive device causes the bathythermograph buoy 10 to break into a plurality of pieces that are no longer operational. Alternatively, the bathythermograph buoy 10 may be configured to be scuttled and broken into pieces in other manners, such as with a scuttling device 38 configured to cause a mechanical connection between a plurality of pieces of the bathythermograph buoy to be disconnected, severed or broken. As yet another alternative, the bathythermograph buoy 10 need not be broken into pieces to be scuttled, but may be rendered inoperative in other manners, such as by permitting water to enter the housing 20, which renders the electrical components inoperative and causes the bathythermograph buoy to sink.

As described above, a bathythermograph buoy 10 and an associated method 48 of operation are provided to measure temperature and/or optionally other parameter(s) within an ocean or another body of water 14. The bathythermograph buoy 10 is configured to ascend after having measured one or more parameters, such as temperature, during its descent through the body of water and to then transmit representations of the one or more parameters that have been measured following its ascent. Thus, the depth to which the bathythermograph buoy 10 descends and measures one or more parameters is not limited by a cable such that the one or more parameters, such as temperature, may be measured at deeper depths than bathythermograph buoys having upper and lower units connected by a cable. By no longer relying upon a cable for communication and, instead, resurfacing and thereafter commencing wireless communications, the bathythermograph buoy 10 may be more compact as the housing 20 of the bathythermograph buoy need not store the cable spool as required of bathythermograph buoys having upper and lower units connected by a cable. Further, by no longer being tethered by a cable, the rate of descent of the bathythermograph buoy 10 may be more consistent and, as a result, the resulting temperature profile with depth may be more accurate by avoiding changes that may otherwise occur in the rate of descent as the cable unspools and the mass that is descending is correspondingly reduced in conjunction with bathythermograph buoys having upper and lower units connected by a cable.

Many modifications and other examples of the present disclosure set forth herein will come to mind to one skilled in the art to which these examples pertain having the benefit of the teachings presented in the foregoing descriptions and the associated drawings. Therefore, it is to be understood that the present disclosure is not to be limited to the specific embodiments disclosed and that modifications and other examples are intended to be included within the scope of the appended claims. Moreover, although the foregoing descriptions and the associated drawings describe examples in the context of certain combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

The invention claimed is:

1. A bathythermograph buoy comprising:
   a housing comprising first and second portions, wherein the first portion comprises ballast;
   one or more sensors carried by the first portion of the housing and configured to repeatedly measure one or more respective parameters as the bathythermograph buoy descends;
   a memory carried by the second portion of the housing and configured to store representations of the one or more respective parameters measured by the one or more sensors;
   a buoyancy modification device configured to increase buoyancy of the bathythermograph buoy to permit the bathythermograph buoy to ascend, wherein the buoyancy modification device is configured to release the first portion of the housing including the one or more sensors to permit the second portion of the housing to ascend without the first portion of the housing including the one or more sensors; and
   a controller configured to trigger the buoyancy modification device to increase the buoyancy of the bathythermograph buoy at a predefined depth or at a predetermined time following launch of the bathythermograph buoy or following initial contact of the bathythermograph buoy with a body of water.

2. The bathythermograph buoy of claim 1 further comprising a transmitter configured to transmit at least some of the representations of the one or more respective parameters measured by the one or more sensors and stored by the memory.

3. The bathythermograph buoy of claim 2 further comprising a surface flotation device configured to be or remain inflated during operation of the transmitter.

4. The bathythermograph buoy of claim 3 wherein the surface flotation device comprises an inflatable bladder.

5. The bathythermograph buoy of claim 4 wherein the controller is configured to trigger inflation of the inflatable bladder upon reaching the surface of the body of water.

6. The bathythermograph buoy of claim 1 further comprising a receiver configured to receive instructions regarding at least some of the operations of the bathythermograph buoy.

7. The bathythermograph buoy of claim 1 wherein the housing is waterproof.

8. A bathythermograph buoy comprising:
a receiver configured to receive instructions regarding at least some of operations of the bathythermograph buoy;
a housing;
one or more sensors carried by the housing and configured to repeatedly measure one or more respective parameters as the bathythermograph buoy descends;
a buoyancy modification device configured to increase buoyancy of the bathythermograph buoy to permit the bathythermograph buoy to ascend;
a controller configured to trigger the buoyancy modification device to increase the buoyancy of the bathythermograph buoy at a predetermined time following launch of the bathythermograph buoy or following initial contact of the bathythermograph buoy with a body of water; and
a transmitter configured to transmit representations of at least some of the one or more respective parameters measured by the one or more sensors following the increase in buoyancy provided by the buoyancy modification device.

9. The bathythermograph buoy of claim 8 wherein the transmitter is configured to transmit representations of at least some of the one or more respective parameters measured by the one or more sensors once the bathythermograph buoy reaches a surface.

10. The bathythermograph buoy of claim 8 further comprising a surface flotation device configured to be or remain inflated during operation of the transmitter.

11. The bathythermograph buoy of claim 10 wherein the surface flotation device comprises an inflatable bladder.

12. The bathythermograph buoy of claim 8 wherein the housing comprises first and second portions, wherein the first portion comprises a ballast and the second portion carries a memory, and wherein the buoyancy modification device is configured to release the first portion of the housing to permit the second portion of the housing to ascend without the first portion of the housing.

13. The bathythermograph buoy of claim 12 wherein the one or more sensors are carried by the first portion of the housing.

14. The bathythermograph buoy of claim 12 wherein the one or more sensors are carried by the second portion of the housing and are also configured to measure one or more respective parameters as the bathythermograph buoy ascends.

15. The bathythermograph buoy of claim 8 wherein the buoyancy modification device comprises a flotation device configured to be inflated following descent to at least the predefined depth, and wherein the transmitter comprises an antenna disposed with the flotation device.

16. A method of operating a bathythermograph buoy, the method comprising:
launching the bathythermograph buoy such that the bathythermograph buoy descends through a body of water;
measuring one or more parameters with one or more sensors of the bathythermograph buoy as the bathythermograph buoy descends;
increasing the buoyancy of the bathythermograph buoy following descent of the bathythermograph buoy to at least a predefined depth, wherein the buoyancy of the bathythermograph buoy is triggered by a controller at a predetermined time following launch of the bathythermograph buoy or following initial contact of the bathythermograph buoy with the body of water; and
following increase in the buoyancy of the bathythermograph buoy, transmitting representations of the one or more parameters measured by the one or more sensors.

17. The method of claim 16 further comprising storing representations of the one or more parameters measured by the one or more sensors prior to ascent of the bathythermograph buoy and transmission of the representations of the one or more parameters.

18. The method of claim 16 further comprising inflating a surface flotation device or causing the surface flotation device to remain inflated while transmitting the representations of the one or more respective parameters measured by the one or more sensors.

19. The method of claim 16 wherein the bathythermograph buoy comprises a housing comprising first and second portions, wherein the first portion comprises ballast, and wherein increasing the buoyancy of the bathythermograph buoy comprises releasing the first portion of the housing to permit the second portion of the housing to ascend without the first portion of the housing.

20. The method of claim 19 wherein the one or more sensors are carried by the second portion of the housing, and wherein the method further comprises measuring one or more parameters with the one or more sensors as the second portion of the housing of the bathythermograph buoy ascends.

* * * * *